US009206893B2

(12) United States Patent
Lenz et al.

(10) Patent No.: US 9,206,893 B2
(45) Date of Patent: Dec. 8, 2015

(54) METHOD FOR OPERATING A VEHICLE POWERTRAIN

(71) Applicant: Ford Global Technologies, LLC, Dearborn, MI (US)

(72) Inventors: Ingo Lenz, Cologne (DE); Leonhard Bartsch, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 335 days.

(21) Appl. No.: 13/659,833

(22) Filed: Oct. 24, 2012

(65) Prior Publication Data
US 2013/0124057 A1   May 16, 2013

(30) Foreign Application Priority Data

Oct. 25, 2011   (DE) .................. 10 2011 085 151
Oct. 28, 2011   (DE) .................. 10 2011 085 395

(51) Int. Cl.
| F16H 59/36 | (2006.01) |
| F16H 59/50 | (2006.01) |
| B60W 30/18 | (2012.01) |
| B60W 10/06 | (2006.01) |

(52) U.S. Cl.
CPC .............. *F16H 59/36* (2013.01); *B60W 10/06* (2013.01); *B60W 30/18018* (2013.01); *B60W 30/18072* (2013.01); *F16H 59/50* (2013.01); *B60W 2030/1809* (2013.01); *B60W 2520/04* (2013.01); *B60W 2520/10* (2013.01); *B60Y 2300/46* (2013.01)

(58) Field of Classification Search
None
See application file for complete search history.

(56) References Cited

U.S. PATENT DOCUMENTS

| 5,314,050 | A * | 5/1994 | Slicker et al. ................. 477/171 |
| 2009/0005218 | A1* | 1/2009 | Lowe et al. .................... 477/116 |
| 2010/0012085 | A1* | 1/2010 | Albrecht ........................ 123/350 |
| 2010/0063693 | A1* | 3/2010 | Lee et al. ......................... 701/54 |
| 2010/0063694 | A1* | 3/2010 | Lee et al. ......................... 701/54 |
| 2010/0145562 | A1* | 6/2010 | Moran ............................ 701/22 |
| 2011/0136625 | A1* | 6/2011 | Yu et al. ........................ 477/185 |
| 2012/0072065 | A1* | 3/2012 | Minamikawa et al. ......... 701/22 |
| 2012/0103749 | A1* | 5/2012 | Kimura et al. ............... 192/54.1 |
| 2012/0179357 | A1* | 7/2012 | Phillips ........................ 701/112 |
| 2012/0197503 | A1* | 8/2012 | McGee et al. .................. 701/54 |
| 2012/0220424 | A1* | 8/2012 | Staudinger et al. ............. 477/80 |
| 2014/0296026 | A1* | 10/2014 | Wenzel et al. .................... 477/5 |

FOREIGN PATENT DOCUMENTS

| DE | 10221701 A1 | 11/2002 |
| DE | 60306411 T2 | 12/2006 |
| WO | WO2005084995 A1 | 9/2005 |
| WO | WO2010121861 A1 | 10/2010 |

* cited by examiner

*Primary Examiner* — Yonel Beaulieu
*Assistant Examiner* — Krishnan Ramesh
(74) *Attorney, Agent, or Firm* — Carlson, Gaskey & Olds

(57) ABSTRACT

A method of operating a vehicle powertrain, includes: sensing a vehicle velocity; selecting at least two of a plurality of control strategies; activating the at least two control strategies, said two control strategies including: (i) operating the vehicle in a stationary start-stop mode when the vehicle speed is below a first threshold; and (ii) operating the vehicle in a rolling stationary start-stop mode when the vehicle speed is above a second threshold.

23 Claims, 1 Drawing Sheet

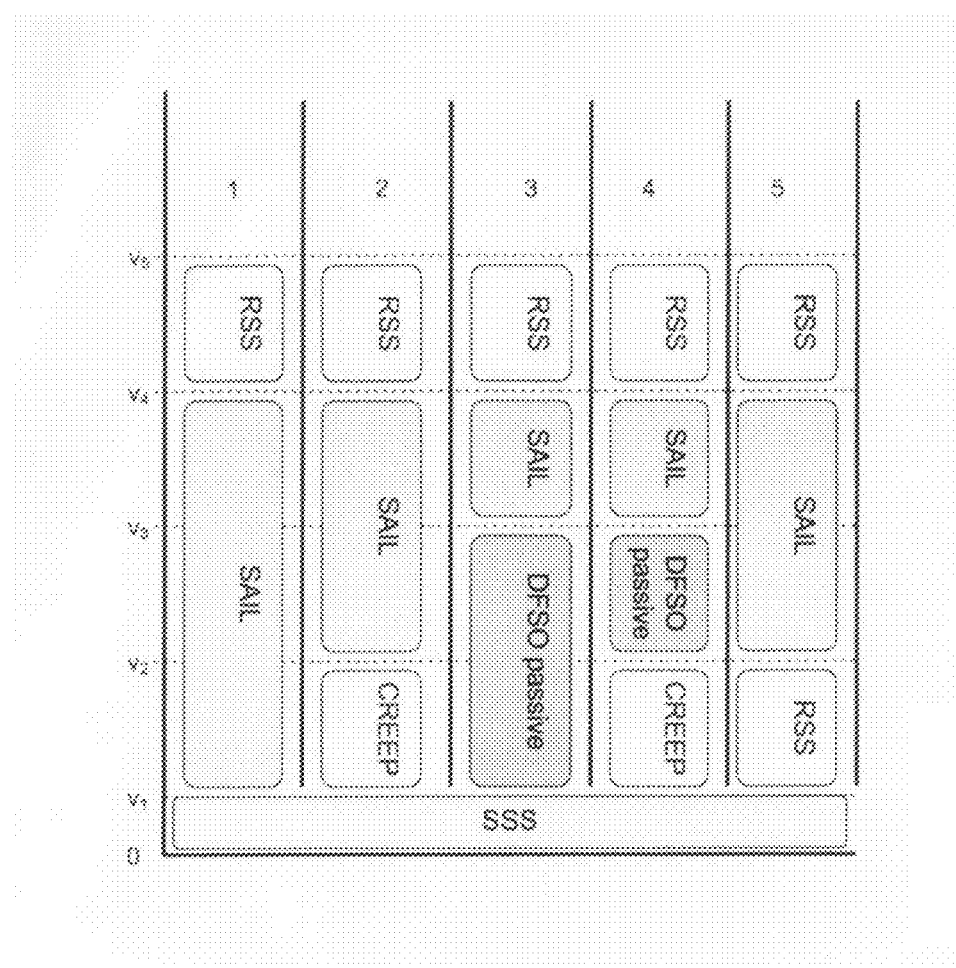

METHOD FOR OPERATING A VEHICLE POWERTRAIN

CROSS-REFERENCE TO RELATED APPLICATIONS

This application is a continuation and claims the benefit of German Patent Application No. DE 102011085151.8 titled "Method for Operating a Motor Vehicle and Drive System of a Motor Vehicle," filed Oct. 25, 2011, and German Patent Application No. DE 102011085395.2 titled "Method for Operating a Motor Vehicle and Drive System of a Motor Vehicle," filed Oct. 28, 2011, which are hereby incorporated in their entirety.

TECHNICAL FIELD

The present disclosure relates to vehicle powertrain control strategies. More particularly, the disclosure relates to a method for operating a motor vehicle having an internal combustion engine and to a drive system of the motor vehicle.

BACKGROUND

The drive motor of a motor vehicle serves primarily for generating a driving force which is transmitted to at least one driven wheel in order to move the motor vehicle. Modern drive motors include, for example, an internal combustion engine such as a spark-ignition engine or diesel engine. Since an internal combustion engine consumes fuel even when not transmitting a drive force, various methods have been proposed to reduce fuel consumption in driving situations were no driving force is required.

It is known, for example, from WO 2010/121861 A1 titled "Method for Operating a Vehicle Having a Freewheel Mode or a Rolling Mode," to operate a vehicle as a function of the result of a plausibility check of an automatic speed control function or adaptive speed control function and/or other current vehicle operating data or vehicle state data in a driving mode where frictional engagement in the drive train is interrupted and the drive motor is operated at an idling speed or switched off. However, this method does not optimize fuel efficiency and engine responsiveness in driving situations.

Therefore it is desirable to provide a method for operating a motor vehicle that improves fuel efficiency and engine responsiveness in driving situations.

SUMMARY

The present disclosure addresses one or more of the above-mentioned issues. Other features and/or advantages will become apparent from the description which follows.

One exemplary embodiment of the present disclosure relates to a method of operating a vehicle powertrain, includes: sensing a vehicle velocity; selecting at least two of a plurality of control strategies; activating the at least two control strategies, said two control strategies including: (i) operating the vehicle in a stationary start-stop mode when the vehicle speed is below a first threshold; and (ii) operating the vehicle in a rolling stationary start-stop mode when the vehicle speed is above a second threshold.

One exemplary embodiment of the present disclosure relates to a method for operating a motor vehicle having an internal combustion engine, the method includes: sensing a velocity of the motor vehicle; sensing actuation of a speed control means; selecting a coasting mode above a minimum speed of said coasting mode when the speed control means is not actuated; and selecting a rolling mode above a maximum speed of the coasting mode when the speed control means is not actuated.

Another exemplary embodiment of the present disclosure relates to a drive system of a motor vehicle having a drive motor, including: a drive train for transmitting driving force to at least one driven wheel of the motor vehicle; and a control device for controlling the drive motor and an automatically actuable clutch, wherein the control device is designed to: (i) select a coasting mode above a minimum speed of said coasting mode when a speed control means is not actuated; and (ii) select a rolling mode above a maximum speed of the coasting mode when the speed control means is not actuated.

One advantage of the present disclosure is that it provides a method and drive system in which the fuel consumption is reduced without complex adaptation of the energy supply system being necessary and without significant impairment of the response behavior of the drive system.

The invention will be explained in greater detail below by way of example with reference to the figures, in which the same reference numbers are used in the figures for identical or essentially identical elements. The above features and advantages and other features and advantages of the present invention are readily apparent from the following detailed description of the best modes for carrying out the invention when taken in connection with the accompanying drawings. In the figures:

BRIEF DESCRIPTION OF THE DRAWINGS

FIG. 1 shows a collection of driving strategies corresponding to exemplary embodiments of the method according to the invention.

DETAILED DESCRIPTION

Referring to the drawing, there is shown a series of control strategies for a vehicle powertrain. The control strategies provide different fuel-savings and/or improve engine responsiveness in different driving conditions. Control strategies can be implemented by a control device, such as for example, an engine control unit (or ECU), powertrain control unit (PCU) or vehicle control unit (VCU). The various strategies include several different driving modes, examples of which are discussed hereinbelow, that are actuated according to the control strategy. The exemplary strategies below trigger driving modes according to vehicle speed and/or operation of cruise control (or a "coasting mode").

Referring now to FIG. 1, five different driving control strategies according to which a motor vehicle can be operated are illustrated in parallel. A drive system of the motor vehicle can be correspondingly actuated according to any one of the strategies. In this context a current velocity of the motor vehicle is sensed and denoted at the top. On the top of the diagram the different strategies are numbered as columns 1 to 5.

In all the exemplary driving strategies, of FIG. 1, the drive system is actuated at a velocity below a speed, $v_1$, in a stationary state in such a way that a stationary mode (SSS, "Static Start Stop") is implemented. The stationary mode is defined by an interrupted frictional engagement in the drive train; in the case of an automatic transmission with a torque converter, the frictional engagement can be closed via the torque converter. An internal combustion engine which serves to drive the motor vehicle is stopped in the stationary mode. A starter of the internal combustion engine can be disconnected therefrom by opening a starter clutch. If there is a request for driving force by a driver actuating the gas pedal, the internal combustion engine is, if appropriate, started by the starter after a starter clutch has been closed, and the opened clutch in the drive train is closed. Manual closing of the clutch is also possible.

In the stationary mode and/or in the rolling mode an electric starter can advantageously be connected to the internal combustion engine of the motor vehicle, for example by virtue of the fact that a starter clutch is closed or a starter is engaged. As a result the electric starter is already in engagement with the drive motor before switching over into another driving mode, which can be triggered for example by actuation of the gas pedal. There is therefore no time required to connect the starter to the internal combustion engine when required. This further improves the response behavior of the drive system.

According to strategy 1, as shown in FIG. 1, a coasting mode ("SAIL") is selected when the vehicle is operating above a velocity $v_1$, e.g., 5 k/h, which corresponds to a maximum speed of the stationary mode and a minimum speed of the coasting mode, and below a velocity, $v_4$, which corresponds to a maximum speed of the coasting mode and a minimum speed of a rolling mode. The maximum speed of the coasting mode may be, for example, approximately 40 to 90 km/h, preferably approximately 50 km/h, but can also be, for example, 108 km/h. In this control strategy this is true if neither a brake pedal nor the gas pedal is actuated. In the coasting mode, frictional engagement in the drive train is interrupted. The drive motor is in operation, for example at an idling speed. The starter is not connected to the drive motor. Above the velocity $v_4$, the rolling mode (RSS, "Rolling Start Stop") is engaged if neither the brake pedal nor the gas pedal is actuated. In the rolling mode, the drive system is actuated by the control device in such a way that the frictional engagement in the drive train is interrupted, for example by opening a clutch, and the drive motor is stopped. The starter can be connected to the drive motor, for example by a closed starter clutch or an engaged starter in order to start the latter when necessary, for example when the gas pedal is actuated. In contrast to the coasting mode, in the rolling mode the drive motor is stopped. The rolling mode can be used up to a maximum speed, $v_5$, of the motor vehicle. In this embodiment, $v_5$ can be a maximum achievable speed for the vehicle; in other embodiments $v_5$ is lower than the vehicle maximum speed. In other embodiments, further strategies are applied between $v_5$ and the maximum speed, $v_{max}$, for the vehicle.

A transition from one driving mode to another can take place by changing vehicle speed, for example, by slowing down when allowing the vehicle to come to a standstill or by increasing the speed when driving downhill. Likewise, a driving mode can be ended by actuating the gas pedal or the brake pedal or by deactivating an economy driving settings by means of vehicle software or operator controlled switches, e.g., "start/stop" or "on/off" buttons. There may be more than one reason why a mode can be changed, such as the actuation of the abovementioned operator control switch, comfort settings, air conditioning settings for the passengers, state of charge for the battery, emission control, vehicle altitude (above sea level), ambient temperature, and engine temperature. As a result the engine restart is slowed down.

According to strategy 2, as shown in FIG. 1, the maximum speed $v_1$ of the stationary mode corresponds to a minimum speed of a creeping mode ("CREEP"). The maximum speed $v_2$ of the creeping mode is the minimum speed of the coasting mode in this embodiment. As shown in FIG. 1, according to strategy 2, the creeping mode is selected between the minimum speed and the maximum speed of the creeping mode $v_1$, $v_2$. In the creeping mode, the frictional engagement between the drive motor and the driven wheels is closed, the drive motor is operating at a corresponding rotational speed and the starter is disconnected from the drive motor. Above the maximum speed $v_2$ of the creeping mode the driving strategy 2 corresponds to the driving strategy 1.

According to strategy 3, as shown in FIG. 1, in the case of a velocity which is higher than the maximum speed $v_1$ of the stationary mode but lower than a minimum speed $v_3$ of the coasting mode which applies in this case, a passive deceleration mode (DFSO passive, "Deceleration Fuel Shut Off") is used when the driver does not actuate the brake pedal or the gas pedal. The maximum speed of the passive deceleration mode may be, for example, approximately 30 to 70 km/h. In the passive deceleration mode, frictional engagement in the drive train is brought about by closing the corresponding clutch resulting in the drive motor running at a rotational speed that corresponds to the current velocity and to a respectively engaged gear or driving position, while taking into account the slip of a torque converter of an automatic transmission. Fuel supply to the internal combustion engine is, however, interrupted so that a deceleration effect of the engine occurs, and the effect is used according to the driving strategy 3 to control coming to a standstill or driving downhill. The starter is preferably not connected to the drive motor but the starter could also be engaged. In the case of a velocity above $v_3$ driving strategy 3 corresponds to strategy 1.

As an alternative to selecting the creeping mode, it is possible according to further embodiments of the method to select the rolling mode when there is a velocity above the maximum speed of the stationary mode and below a minimum speed of the coasting mode when the speed control means is not actuated. This provides a driving mode that is particularly economical in terms of fuel.

As is shown by FIG. 1, driving strategy 4 corresponds to the strategy 3 when the vehicle is operating at a speed above $v_2$. Below the speed $v_2$, which in this case represents the minimum speed of the passive deceleration mode but above the maximum speed $v_1$ of the stationary mode, the creeping mode is selected according to strategy 4.

Finally, according to strategy 5, as shown in FIG. 1, the rolling mode is used both in a speed range between $v_1$ and $v_2$, i.e. between the maximum speed of the stationary mode and the minimum speed of the coasting mode as well as in the speed range above $v_4$, i.e. above the maximum speed of the coasting mode.

In the stationary mode, or at a very low velocity of less than 5 km/h, a relatively long delay between the actuation of the gas pedal and a perceptible acceleration, for example 400 ms, is tolerable. Therefore, in such a driving situation, the stationary mode in which a drive motor of the motor vehicle is switched off is used if neither the gas pedal nor the brake pedal is actuated.

When there is a velocity of up to approximately 60 km/h a delay of approximately 70 to 80 ms is expected, and when there is a speed up to approximately 100 km/h a delay of up to approximately 160 ms is expected, without the response behavior of the drive system being appreciably delayed. In this speed range it is therefore favorable that the internal combustion engine remains in operation even if no driving force is required. This is achieved by means of the coasting mode or the passive deceleration mode. As a result, when restarting occurs a delay is brought about which in most cases is not more than approximately 50 to 100 ms above the specified values. In this way the fuel consumption is reduced but significant delay of the response behavior is avoided.

When there is a velocity above approximately 100 km/h, a relatively long delay between the actuation of the gas pedal and an appreciable acceleration, for example, approximately 260 ms at 150 km/h and 400 ms at 190 km/h, is tolerated. Since the rolling mode is used in this speed range, a consumption-optimized driving mode is therefore achieved, while a delay of up to 450 ms, which occurs as a result of the restarting of the drive motor, is generally acceptable.

This brings about a mode of operation of the motor vehicle which overall has reduced consumption and where the response behavior of the drive system is not significantly delayed. In addition, this reduces adaptations for energy supply to vehicle electrical systems.

The speeds $v_1$ to $v_5$ do not have to be the same in all the strategies. The speeds $v_1$ to $v_5$ can also depend on further parameters which characterize a driving situation. The strategies can each be configured in such a way that in the case of a velocity that is equal to a maximum speed or minimum speed, the driving mode is assigned to a relatively low or relatively high velocity. The speed at which another driving mode is selected can also be different in the case of a transition in the direction of a relatively high speed.

In another embodiment, when the brake pedal is actuated, an active deceleration mode which corresponds to the passive deceleration mode, but includes an additional braking effect by the service brake, can be selected. The selected driving mode can also depend on the current speed and, if appropriate, on further parameters of the vehicle and on a driving situation. In addition, the driver can by actuating the gas pedal, bring about a change to the normal driving mode in which the motor vehicle is accelerated, for example, by a driving force which is generated in accordance with the position of the gas pedal, or is kept at a constant velocity.

A driving mode of the motor vehicle is selected automatically on the basis of the sensed velocity and the actuation or non-actuation of the speed control means and, if appropriate, on the basis of further parameters.

The disclosed methods can advantageously be used when a motor vehicle is allowed to roll from an initial speed to a relatively low final speed or to a stationary state. The method is, however, also advantageous when traveling downhill from a stationary state or from an initial speed to a relatively high final speed. The methods can also be advantageously used when rolling to a standstill when traveling downhill or, for example, even in other driving situations in which the gas pedal is not actuated.

According to the invention, the response behavior of the drive system of the motor vehicle is therefore optimized while taking into account a mode of operation which is economical in terms of fuel. In addition, in many cases, the supply of electrical energy is ensured without modification with the result that no complex adaptation of the electrical energy supply system of the motor vehicle is necessary. As a result, the motor vehicle is controlled as it comes to a standstill or travels downhill in such a way that even with limited adaptation of the electrical system a mode of driving which is particularly economical in terms of fuel is made possible and the response behavior is not significantly delayed.

In one embodiment a speed control means comprises a brake pedal, in which case a further driving mode is selected when the brake pedal is actuated. The further driving mode permits a mode of driving which is particularly economical in terms of fuel, even in the case of a deceleration process which is initiated or assisted by actuation of the brake pedal, without complex adaptation of the electrical system of the motor vehicle. If a maximum speed is determined for the coasting mode, this also applies in particular when there is a velocity above this speed.

Several or all of the specified alternatives can also be implemented successively as a function of the speed, and, if appropriate, other parameters. In particular, before frictional engagement between the drive motor and at least one driven wheel is restored, the drive motor can be operated at a rotational speed which corresponds to the rotational speed of a motor-side drive shaft of the transmission. This brings about a jolt-free transition between a driving mode without frictional engagement to a driving mode having frictional engagement between the drive motor and the driven wheel.

Those familiar with the art to which this invention relates will recognize various alternative designs and embodiments for practicing the invention within the scope of the appended claims.

We claim:

1. A method of operating a vehicle powertrain, comprising:
   sensing a vehicle velocity;
   selecting at least two of a plurality of control strategies;
   activating the at least two control strategies, said two control strategies including:
   (i) operating the vehicle in a stationary start-stop mode when the vehicle speed is below a first threshold; and
   (ii) operating the vehicle in a rolling start-stop mode when the vehicle speed is above a second threshold, a drive motor of the vehicle powertrain stopped during both the stationary start-stop mode and the rolling start-stop mode.

2. The method of claim 1, wherein one of the at least two control strategies includes: (iii) operating the vehicle in a passive deceleration fuel shut-off mode when the vehicle speed is above a third threshold.

3. The method of claim 2, wherein the first and third thresholds are equal.

4. The method of claim 2, wherein one of the at least two control strategies includes: (iv) operating the vehicle in a sailing mode when the vehicle speed is below the second predetermined threshold and above a fourth threshold.

5. The method of claim 4, wherein one of the at least two control strategies includes: (iv) operating the vehicle in a creeping mode when the vehicle speed is below the third predetermined threshold and above the first threshold.

6. The method of claim 1, wherein one of the at least two control strategies includes: (iii) operating the vehicle in a sailing mode when the vehicle speed is below the second predetermined threshold and above a third threshold.

7. The method of claim 6, wherein the first threshold and third threshold are equal.

8. The method of claim 6, wherein one of the at least two control strategies includes: (iv) operating the vehicle in a rolling start-stop mode when the vehicle speed is above the first threshold and below the third threshold.

9. The method of claim 6, wherein one of the at least two control strategies includes: (iv) operating the vehicle in a creeping mode when the vehicle speed is above the first threshold and below the third threshold.

10. A method for operating a motor vehicle having an internal combustion engine, comprising:
    sensing a velocity of the motor vehicle;
    sensing actuation of a speed control means;
    selecting a coasting mode above a minimum speed of said coasting mode when the speed control means is not actuated; and selecting a rolling mode above a maximum speed of the coasting mode when the speed control means is not actuated.

11. The method of claim 10, further comprising:
selecting a stationary mode below a maximum speed of said stationary mode.

12. The method of claim 11, further comprising:
connecting an electric starter to the internal combustion engine when in the stationary mode or in the rolling mode.

13. The method of claim 10, further comprising:
selecting a creeping mode in which there is frictional engagement between the engine and at least one driven wheel of the motor vehicle when above the maximum speed of the stationary mode and below a minimum speed of the coasting mode.

14. The method of claim 10, further comprising:
selecting a rolling mode when above a maximum speed of a stationary mode and below the minimum speed of the coasting mode.

15. The method of claim 10, further comprising:
selecting a passive deceleration mode when above the maximum speed of the stationary mode and below a minimum speed of the coasting mode and when the speed control means is not actuated;
wherein in the deceleration mode there is frictional engagement between the drive motor and at least one driven wheel of the motor vehicle, and the supply of fuel to the drive motor is interrupted.

16. The method of claim 15, further comprising:
selecting a creeping mode when below a minimum speed of the passive deceleration mode and above the maximum speed of the stationary mode;
wherein in the creeping mode there is frictional engagement between the drive motor and at least one driven wheel of the motor vehicle.

17. The method of claim 10, wherein selecting a drive mode is done by actuating a pedal brake.

18. A drive system of a motor vehicle having a drive motor, comprising:
a drive train for transmitting driving force to at least one driven wheel of the motor vehicle; and
a control device for controlling the drive motor and an automatically actuable clutch, wherein the control device is designed to: (i) select a coasting mode above a minimum speed of said coasting mode when a speed control means is not actuated; and (ii) select a rolling mode above a maximum speed of the coasting mode when the speed control means is not actuated.

19. The drive system of claim 18, wherein the control device is further configured to select a stationary mode below a maximum speed of said stationary mode.

20. The drive system of claim 18, wherein the control device is further configured to select a creeping mode, in which there is frictional engagement between the drive motor and at least one driven wheel of the motor vehicle, when above the maximum speed of the stationary mode and below a minimum speed of the coasting mode.

21. The drive system of claim 18, wherein the control device is further configured to select a rolling mode when above a maximum speed of a stationary mode and below the minimum speed of the coasting mode.

22. The drive system of claim 18, wherein the control device is further configured to select a passive deceleration mode when above the maximum speed of the stationary mode and below a minimum speed of the coasting mode and when the speed control means is not actuated.

23. A method for operating a motor vehicle having an internal combustion engine, comprising:
selecting a coasting mode above a minimum speed of said coasting mode when a brake pedal and a gas pedal are not actuated, said internal combustion engine running during said coasting mode;
selecting a rolling mode above a maximum speed of said coasting mode when said brake pedal and said gas pedal are not actuated, said internal combustion engine stopped during said rolling mode; and
selecting a stationary mode below said minimum speed of said coasting mode when said brake pedal and said gas pedal are not actuated, said internal combustion engine stopped during said stationary mode.

\* \* \* \* \*